United States Patent [19]

Chambers et al.

[11] Patent Number: 5,672,767
[45] Date of Patent: Sep. 30, 1997

[54] PROCESS FOR PREPARING POLYETHER COMPOUNDS

[75] Inventors: Richard Dickinson Chambers, Durham; Andrew Keith Joel, Preston, both of United Kingdom

[73] Assignee: BNFL Fluorochemicals Ltd., United Kingdom

[21] Appl. No.: 675,842

[22] Filed: Jul. 5, 1996

Related U.S. Application Data

[63] Continuation of Ser. No. 332,594, filed as PCT/GB94/00381, Feb. 25, 1994, abandoned.

[30] Foreign Application Priority Data

Feb. 26, 1993 [GB] United Kingdom ............... 9303916
Feb. 26, 1993 [GB] United Kingdom ............... 9303917

[51] Int. Cl.$^6$ .................. C07G 43/11; C08G 73/24
[52] U.S. Cl. ................. 568/615; 568/603; 568/604; 568/606; 528/397; 528/401; 528/402; 549/380; 549/428; 549/504; 549/511
[58] Field of Search ................. 568/603, 604, 568/606, 615; 528/397, 401, 402; 549/380, 428, 504, 511

[56] References Cited

U.S. PATENT DOCUMENTS 4,736,045  4/1988  Drakesmith et al. ............... 549/380
4,877,905  10/1989  Chambers ........................... 568/165

*Primary Examiner*—Samuel A. Acquah
*Attorney, Agent, or Firm*—Nixon & Vanderhye

[57] ABSTRACT

A process for the preparation of a perfluoropolyether having a general formula:

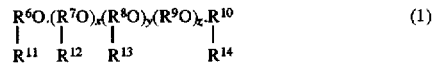

as defined hereinbefore, which process includes the direct fluorination with elemental fluorine of a polyether having a general formula:

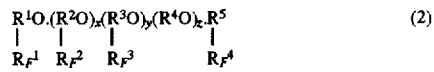

as defined hereinbefore, wherein the fluorination is carried out in the presence of a solvent which is an ether having at least one substituent $R_F$, wherein $R_F$ is a fluorinated hydrocarbon group. The said solvent ether is preferably a fluorinated volatile ether. The said solvent ether preferably has at least two groups $R_F$ which may be the same or different groups. Each group $R_F$ preferably has from two to four carbon atoms and at least two fluorine atoms. The said solvent ether may be an alicyclic ether having from 3 to 5 carbon atoms in its alicyclic ring. The intermediate polyether of formula (2) may be prepared by a process in which an appropriate straight-chained or cyclic polyether is reacted with an appropriate fluoroalkene in the presence of a sensitising medium and ultra-violet radiation is applied to energise the medium and promote multiple fluorination.

12 Claims, No Drawings

PROCESS FOR PREPARING POLYETHER COMPOUNDS

This is a continuation of application Ser. No. 08/332,594, filed as PCT/GB94/00381, Feb. 25, 1994, now abandoned.

The perfluoropolyethers which are the products of the process of the present invention are the subject of U.S. Pat. No. 4,877,905 granted to Richard Dickinson Chambers, one of the present inventors. Those perfluoropolyethers were invented with U.S. Government support under AFOSR Grant 82-0084 awarded by the United States Air Force. The U.S. Government has certain rights in such perfluoropolyethers.

(D) BACKGROUND OF THE INVENTION

1. Field

The present invention relates to polyether compounds and their preparation.

Various perfluoropolyethers (that is, fully fluorinated polymeric ether compounds) have been developed in recent years and are available as commercial products. These products display a variety of useful properties, including high resistance to thermal and chemical attack, very low solubility in most usual solvents, and very good lubricating properties.

2. Description of the related art

In EP0247887A by R D Chambers there is described a route to such polyethers of general formula (1) as follows:

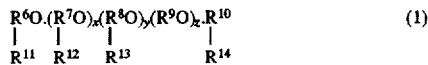

wherein the symbols $R^6$ to $R^{14}$ each represents a fully fluorinated hydrocarbon group, x is an integer and each of y and z is zero or an integer, and the sum of x, y and z is at least 2 and not greater than 100, preferably not greater than 50. Preferably the ratio of (x+y):z is as high as possible. Each of the groups $R^6$, $R^7$, $R^8$ and $R^{10}$ may contain a substituent fully fluorinated hydrocarbon group in addition to the groups $R^{11}$, $R^{12}$, $R^{13}$ and/or $R^{14}$.

The polyethers (1) are prepared by direct fluorination with elemental fluorine of intermediate substituted polyethers of general formula (2) as follows:

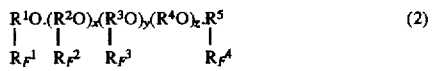

wherein the symbols $R^1$, $R^2$, $R^3$, $R^4$ and $R^5$ each represent substituted or unsubstituted hydrocarbon groups, which groups may differ, the symbols $R_F^1$, $R_F^2$, $R_F^3$ and $R_F^4$ each represent fluorine-containing hydrocarbon groups containing at least two carbon atoms and at least two fluorine atoms, which groups may differ, or the combination $R^1$—$R_F^1$ and/or the combination $R_5$—$R_F^4$ represents a fluorine-containing alkyl or alkenyl group, x is an integer and each of y and z is zero or an integer, and the sum of x, y and z is at least 2 and not greater than 100, preferably not greater than 50. Within these limits, the ratio of (x+y):z is preferably as high as possible.

In the final product, not only the hydrogen atoms on the main polyether chain but also those remaining in the groups $R_F^1$ to $R_F^4$ may be replaced by fluorine.

The prior art method of carrying out the said fluorination as described in EP0247887A is not ideal and the purpose of the present invention is to provide an improved method.

(E) SUMMARY OF THE INVENTION

According to the present invention in a first aspect there is provided a process for the preparation of a perfluoropolyether having a general formula:

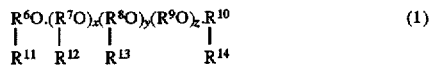

as defined hereinbefore, which process includes the direct fluorination with elemental fluorine of a polyether having a general formula:

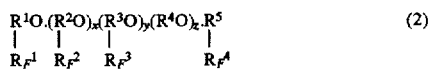

as defined hereinbefore, wherein the fluorination is carried out in the presence of a solvent which is an ether having at least one substituent $R_F$, wherein $R_F$ is a fluorinated hydrocarbon group.

The said solvent ether is preferably a fluorinated volatile ether.

The said solvent ether preferably has at least two groups $R_F$ which may be the same or different groups.

Each group $R_F$ preferably has from two to four carbon atoms and at least two fluorine atoms.

The said solvent ether may be an alicyclic ether having from 3 to 5 carbon atoms in its alicyclic ring. Preferably the said solvent ether is of the formula:

Preferably in formula (3) each $R_F$ group is $CF_2CFHCF_3$.

According to the present invention in a second aspect the is provided a perfluoropolyether of formula (1) defined hereinbefore which has been prepared by the process of the first aspect.

The inventor has found that fluorinated ethers can be efficient solvents for the process according to the first aspect. As the fluorination of the polyethers of formula (2) proceeds, it does so in concert with fluorination of the solvent, keeping the system mobile. For example, at the end of the reaction there is a perfluorinated solvent as well as the desired perfluoropolyether and, if the solvent is volatile, this assists separation of the product from the solvent.

Although the fluorination of the intermediate substituted polyethers (2) can be begun at room temperature, it is desirable that steps be taken nonetheless to control the heat generated by the reaction. Such steps, which depend upon balancing the rate of addition of fluorinating agent against the rate of removal of heat, are well known to those skilled in the art and need not be described at length herein. They include carrying out the reaction in a thin film reactor, wherein the reaction mixture is spread in a thin film over a cooled surface of good thermal conductivity. Such reactors include the Bigelow type reactor. An alternative method of controlling the heat of reaction is by evaporative heat transfer using a refluxing volatile liquid diluent. A third method lies in the use of a so-called "aerosol" reactor.

In one particularly preferred form of the invention, fluorination is effected by introducing a gaseous mixture of fluorine and nitrogen into the substituted polyether (2) in liquid form. The gaseous mixture may be introduced as a stream of fine bubbles, preferably in a reactor wherein the polyether and the gaseous mixture meet in counterflow. The reaction is preferably carried out at atmospheric pressure or more preferably under a somewhat elevated pressure. If desired, the reaction may be assisted by, for example, irradiating the reaction mixture with ultra-violet light.

When the fluorinating agent is a mixture of fluorine and nitrogen, the concentration of fluorine in the mixture may be progressively increased as the reaction proceeds until the polyether (2) is fully fluorinated. For example, the reaction may be begun using a fluorine/nitrogen mixture containing a relatively small percentage, say 5 to 25 per cent, of fluorine, which may progressively be increased to 100 per cent fluorine to remove the last unsubstituted hydrogen atoms from the polyether molecule.

According to the present invention in a preferred form there is the process for the preparation of intermediates having units of general formula (2) hereinbefore which process includes the step of reacting a linear or branched chained or cyclic polyether of or having units of general formula (4) or (5) given hereafter with a straight chained or cyclic fluoroalkene containing at least two fluorine atoms in the presence of a sensitising medium which when energised helps to induce the reaction, ultra-violet radiation being applied to the said medium to provide energisation of the medium.

Formulae (4) and (5) are as follows:

  (4)

or

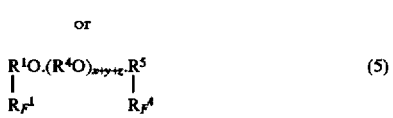  (5)

In the foregoing general formulae (4) and (5), the groups $R^1$ and $R^5$ may each contain a single carbon atom but preferably at least the group $R^4$ contains at least 2 carbon atoms, more preferably from 2 to 4 carbon atoms. The groups may be linear branched or cyclic and adjacent groups may be combined with the intervening oxygen atom in a cyclic ether group. The group $R^4$ may represent a mixture of groups.

Thus one or more of the groups $R^1$, $R^4$ and $R^5$ may be a $-C_2H_4-$ group or a $-C_3H_6-$ or $-C_4H_8-$ group or the polyether (4) or (5) may be a poly(cyclic ether). If desired, the end-groups $R^1$ and $R^5$ in particular may be substituted groups, for example $-C_2H_4-$ groups in which at least one hydrogen atom has already been substituted by a fluorine atom.

The said sensitising medium may be an organic liquid which is desirably a solvent for the reagents having a strong extinction coefficient in he spectral region of the applied ultra-violet radiation and may, for example, be acetone or trifluorethanol.

Examples of polyethers which may be employed as the compound of Formula (2) in the process according to he preferred form of the present invention include diethyl (polyethylene oxides); dihydroxy (polyethylene oxides); diethyl (poly tetrahydrofurans) and cyclic polyethers such as crown ethers.

Examples of fluoroalkenes which may be employed in the process according to the preferred form of the present invention include fluoropropenes, fluorobutenes, fluoropentenes and fluorohexenes containing at least five fluorine atoms, eg pentafluoropropene, hexafluoropropene and octafluorobutene and analogous ring containing compounds, eg fluorocyclobutenes fluorocyclopentenes and fluorocyclohexenes containing at least six fluorine atoms.

Beneficially and unexpectedly the process of the preferred form of the present invention allows a greater number of groups in the intermediates of formula (2) to be obtained as fluorinated groups than by using the aforementioned prior art processes for the preparation of such intermediates. The possibility of incorporating a greater number of fluorinated groups is beneficial because it allows greater choice of properties in the resultant perfluorinated end products.

Comparative examples illustrating this improvement are shown in Table 1 as follows:

TABLE 1

| DEPEG | MAX | DTBP | gamma-rays | UV |
|---|---|---|---|---|
| 400 | 11 | 6 | — | 8 |
| 600 | 15 | 11*, 13* | 8 | 14 |
| 2000 | 45 | 20 | 17 | 35 |

*different examples of the same route

In each case in Table 1 a fluorinated polyether compound of formula (2) is produced from an unfluorinated diethyl (polyethylene glycol) alternatively known as diethyl (polyethylene oxide) and hexafluoropropene as the fluoroalkene by three different routes. The diethyl polyethylene glycol in each case is indicated under the heading "PEG" where the number stated is the average molecular weight of the commercially available polyethylene glycol used to form the diethyl derivative. The numbers under the column heading "MAX" are the maximum number of groups in the diethyl polyethylene glycol molecule which are available to be converted to fluoro-groups. The numbers under the other headings are the number of fluoro-groups produced (or fluorine incorporations) for each diethyl polyethylene glycol using the route in question. The first route denoted by the column heading "DTBP" is the prior art route of Examples 2, 4, 6 and 8 in EP 0247887 using ditertiary butyl peroxide (DTBP). The second route denoted by the column heading "gamma-rays" is another prior art route mentioned as a possibility but not exemplified in EP 0247887. This route as used in this comparative example is described in Procedure E and Examples A1 and A2 below.

The third route denoted by the column heading "UV" is the process of the preferred form of the present invention as exemplified in Examples 7 to 9 given below.

Further benefits are obtained by using the process of the preferred form of the present invention as follows. A cleaner product is obtained than by using the DTBP since the latter results in peroxide residues. Product breakdown experienced with the DTBP route and the use of relatively large quantities of unpleasant peroxides is avoided. The process according to the present invention gives results which are more reproducible than those obtained with the prior art. The process according to the present invention may be carried out at temperatures lower than those required in the DTBP route. The latter requires temperatures of typically 140° C. whereas the process of the present invention can be carried out at temperatures of 50° C. or below, eg room temperature eg 20° C. to 25 ° C. The "gamma-rays" route also requires elevated temperatures to obtain satisfactory reaction.

Furthermore, the process according to the preferred form of the present invention allows less reactive polyethers used as starting materials to be fluorinated more readily to compounds of Formula (2) compared with the prior art routes. For example, trioxan which has a very low reactivity and crown ethers are easier to fluorinate by the process of the present invention.

A further unexpected benefit of the preferred form of the process according to the present invention is that if the fluoralkene used in the process is or includes a cyclic fluoralkene cyclic fluorinated groups may be introduced much more extensively in the intermediates of formula (2) than by using the prior art processes. The advantage in this improvement is that the presence of cyclic groups in the intermediates obtained thereby gives greater opportunities to tailor the perfluorinated end products of formula (1) to end user requirements. For example, perfluorocyclobutene of formula (6) and perfluorcyclopentene of formula (7) as follows give as side groups in the compounds of formula (2) the following cyclic fluorinated groups of formulae (6a) and (7a) as follows:

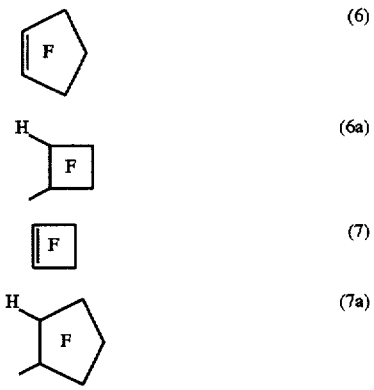

In the process according to the preferred form of the present invention the ultraviolet (UV) radiation employed may be obtained from any known UV source conventionally used in photochemistry. For example it may be obtained from a mercury lamp. The radiation source may have a power output of 0.1 KW to 10 KW. The reaction vessel may be located a distance of 50 mm to 200 mm from the radiation source.

Embodiments of the present invention will now be described, by way of example only, with reference to the following Examples:

EXAMPLE 1

Fluorination of poly (2H-hexafluoropropyl)-[diethyl poly (ethylene glycol) 600]

Poly (2-hexafluoropropyl)-[diethyl poly (ethylene glycol) 600] of formula (8) as follows:

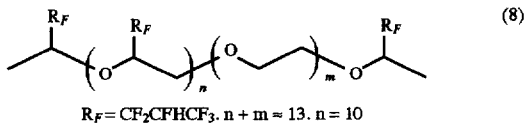

$R_F = CF_2CFHCF_3$. $n + m = 13$. $n = 10$ (where the average number of ethylene glycol units is about 13, and the average number of 2H-hexafluoropropyl groups is 12) (2.2 g) was dissolved in 1,1,2,3,3-hexafluoro-4,5-di (1'-methyl-2',2',3',4',4'-4'-hexafluorobutoxy)pentane of formula (9) as follows:

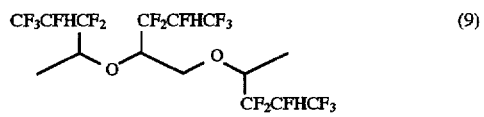

(7.8 g) and the solution placed in a fluorinated ethylene propylene (FEP) tube of internal diameter approximately 4.5 mm. Fluorine, diluted in nitrogen, was introduced into the FEP tubing through a polytetrafluoroethylene (PTFE) capillary tube, at a rate that would provide a steady stream of bubbles over 18 days. In each day an 800 ml cylinder, originally containing 10 atm of gas, was discharged through the reaction vessel. The concentration of fluorine in nitrogen was increased over this period as follows: 5 per cent (4 days); 10 per cent (2 days); 15 per cent, 20 per cent, 25 per cent, 30 per cent and 50 per cent (1 day each) For the remaining 7 days 50 per cent fluorine in nitrogen was used, whilst concurrently irradiating the reaction mixture with ultra-violet light from a 1000 watt, medium pressure mercury lamp at a distance of 0.1 m, the reaction mixture also being cooled by a fan to approximately 50° C.

After complete fluorination had been achieved, as shown by $^1H$ n.m.r spectroscopy, the solvent was removed under vacuum, having also been perfluorinated to perfluoro[1,2-di(1-methylbutoxy)]pentane of formula (10) as follows:

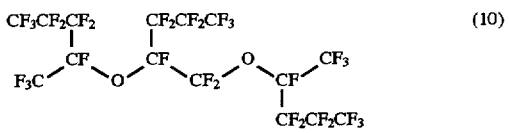

(6.9 g). A fairly viscous, clear, colourless liquid was left, which $^{19}F$ n.m.r. spectroscopy showed to be the desired perfluoropolyether of formula (11) as follows:

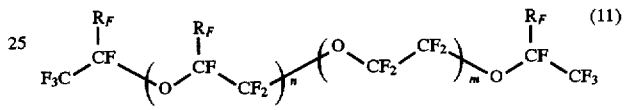

$R_F = CF_2CF_2CF_3$. $n + m = 13$. $n = 10$ in a yield of 1.3 g.

EXAMPLE 2

Florination of poly(2H-hexafluoropropyl)-[diethyl poly (ethylene glycol) 600].

Poly(2-hexafluorpropyl)-[diethyl poly (ethylene glycol) 600] of formula (8) a define hereinbefore (4.7 g) was dissolved in 2,5-di(2H-hexafluoropropyl)oxolane of formula (12) as follows:

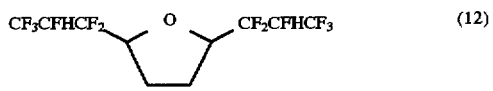

(10ml) in a length of FEP tubing. Fluorine in nitrogen was passed through the solution, the concentration of fluorine in nitrogen being increased stagewise as follows: 5 per cent; 10 per cent; 20 per cent; 30 per cent and 50 per cent, with at each stage 7 liters of the gas mixture being passed through in 8 to 12 hours. A further 3 stages Were required of 50 per cent fluorine in nitrogen under ultra-violet light irradiation as carried out in Example 1. The perfluorinated solvent of formula (13) as follows:

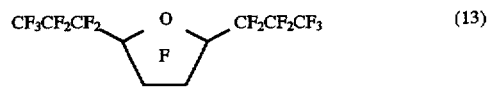

was removed under vacuum (5.2 g), the loss of mass being due to the volatility of the perfluorinated material. A perfluoropolyether of formula (11) as hereinbefore defined (3.7 g) remained as a viscous, clear colourless, liquid.

EXAMPLE 3

Fluorination of poly(2H-hexafluoropropyl)-[diethyl poly (ethylene glycol 600]

Poly(2H-hexafluoropropyl)-[diethyl poly(ethylene glycol) 600] of formula (8) as defined hereinbefore (7.6 g)

was dissolved in 2,5-di(2H-hexafluoropropyl)oxolane of formula (12) as defined hereinbefore (11.0 g) and placed in an FEP tube. Fluorine in nitrogen was bubbled through the solution over a period of 18 days, the concentration of fluorine in nitrogen being increased stagewise as described in relation to Example 1.

After complete fluorination had been achieved, as shown by $^1$H n.m.r. spetroscopy, the solvent was removed under reduced pressure, having also been perfluorinated to perfluoro-2,5-dipropyloxolane of formula (13) as defined hereinbefore. A clear, colourless liquid remained, which $^{19}$F n.m.r. showed to be a perfluoropolyether of formula (11) as defined hereinbefore, in a yield of 6.0 g, 54%

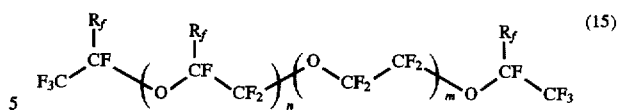

where $R_f=CF_2CF_2CF_3$ n≈6, m≈2 in a yield of 5.4 g, 64%.

EXAMPLE 5

Fluorination of poly(2H-hexafluoropropyl)-diethyl polytetrahydrofuran

Poly(2H-hexafluoropropyl)-diethyl polytetrahydrofuran of formula (16) as follows:

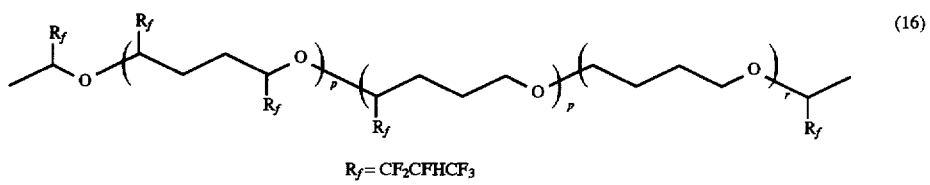

$R_f = CF_2CFHCF_3$

EXAMPLE 4

Fluorination of poly(2H-hexafluoropropyl)-[diethyl poly (ethylene glycol) 400]

Poly (2H-hexafluoropropyl)-[diethyl poly(ethylene glycol)400] of formula (14) as follows:

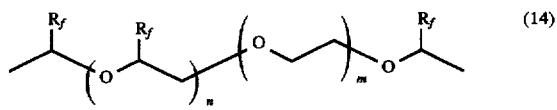

where $R_f=CF_2CFHCF_3$ n__6, m__2 3.6 g (where the average number of ethylene glycol units is about 8, and the average number of 2H-hexafluoropropyl groups is 8) was dissolved in 2,5-di(2H-hexafluoropropyl)oxolane of formula (12) as defined hereinbefore (2.5 g) and placed in an FEP tube. Fluorine in nitrogen was bubbled through the solution, as hereinbefore described, over a period of 22 days, the concentration of fluorine in nitrogen being increased stagewise as follows: 5 per cent (6 days); 10 per cent, 15 per cent, 20 per cent, 25 per cent, 30 per cent and 50 per cent (2 days each). For the remaining 4 days, 50 per cent fluorine in nitrogen was used, whilst concurrently irradiating the reaction mixture with ultra-violet light as hereinbefore described.

After complete fluorination had been achieved, the solvent was removed under reduced pressure, having also been perfluorinated to perfluoro-2,5-dipropyloxolane of formula (13) as defined hereinbefore. The remaining liquid was distilled at 200° C./0.05 mm Hg on a Kugelrohr apparatus to give a clear, colourless liquid which $^{19}$F n.m.r. spectroscopy showed to be the desired perfluoropolyether of formula (15) as follows:

(6.9 g) was dissolved in 2,5-di(2H-hexafluoropropyl) oxolane of formula (12) as defined hereinbefore (12.4 g) and placed in an FEP tube. Fluorine in nitrogen was bubbled through the solution over a period of 22 days, the concentration of fluorine in nitrogen being increased stagewise as described in relation to Example 4.

After complete fluorination had been achieved as shown by $^1$H n.m.r. spectroscopy, the solvent was removed under reduced pressure, having also been perfluorinated to perfluoro-2,5-dipropyloxolane of formula (13) as defined hereinbefore. The remaining liquid was distilled at 200° C./0.05 mmHg using a Kugelrohr apparatus to give a clear colourless liquid which $^{19}$F n.m.r. showed to be the desired perfluoropolyether of formula (17) as follows:

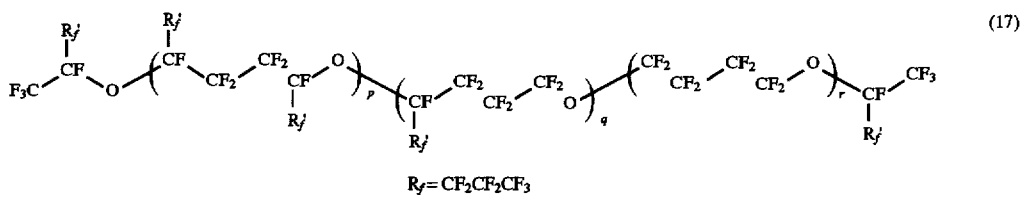

$R_f = CF_2CF_2CF_3$ in a yield of 5.4 g, 64%.

EXAMPLE 6

Fluorination of poly(2H -hexafluoropropyl-18-crown-6

6.9 g of poly(2H-hexafluoropropyl)-18-crown-6 of formula (18) as follows:

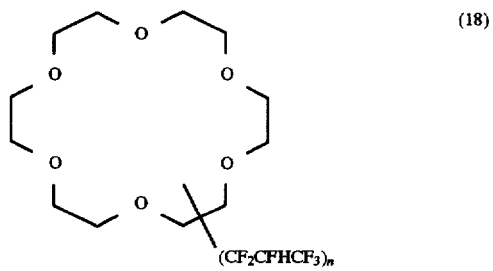

n = 5.3 (average)

(where the average number of 2H-hexafluoropropyl groups is 5.3) was dissolved in 2,5-di(2H-hexafluoropropyl)oxolane of formula (12) as hereinbefore described (12.4 g) in a length of FEP tubing. A mixture of fluorine in nitrogen was introduced into the tubing and the concentration of fluorine in the mixture was increased over a period of 15 days in a first stage as follows: 5 per cent (6 days); 10 per cent (2 days); 15 per cent, 20 per cent, 25 per cent and 30 per cent (1 day each), and 50 per cent (3 days). 50 per cent fluorine in nitrogen was then used in a second stage whilst the reaction mixture was irradiated with ultra-violet light, as described in relation to Example 1, for 4 days. The resulting perfluorinated solvent of formula (13) as hereinbefore described was removed under vacuum to yield a clear, colourless material, the perfluorinated product of formula (19) as follows:

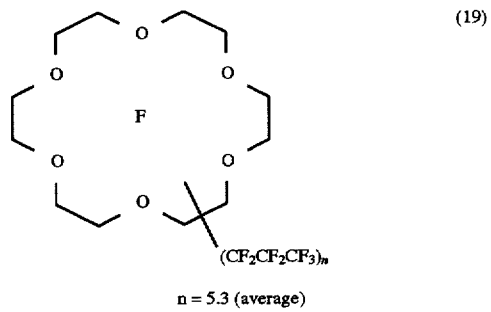

n = 5.3 (average)

(7.3 g), which could be distilled on a Kugelruhr apparatus at about 150°/0.03 mmHg.

An advantage of the present invention is that it overcomes the problem of maintaining a mobile medium for the fluorination steps in the route for producing perfluorinated polyethers. Previously, use of highly fluorinated solvent was not possible because such solvents were unable to dissolve sufficient quantities of starting materials to make fluorination practicable and, in addition, this limited the ability to control the fluorination steps.

As already indicated, perfluoropolyethers are distinguished by an attractive combination of properties including high resistance to thermal and chemical attack, very low solubility in many solvents and excellent lubricating properties. They are therefore of particular value as lubricants in chemically aggressive environments (for example in oxygen and chlorine compressors) or for highly sensitive equipment (for example the drives for computer disks and tapes) or as surface lubricants for computer disks and tapes. Perfluoropolyethers may also be sprayed on to porous surfaces (for example masonry) to provide repellency to liquid water (for example in the form of acid rain). They have further value as highly stable hydraulic fluids.

Examples of the preparation of the intermediate compounds of formula (2) using processes of the preferred form of the present invention using ultra violet radiation will now be described in the following Examples.

In the Examples which follow, the following general procedure Procedure A was used to react the starting polyether of formula (4) or (5) with hexafluoropropene (or alternative fluoroalkene).

Procedure A

Solid and liquid reagents were introduced into a glass Carius tube (of capacity about 60 ml), together with solvent if used, and degassed twice by freeze-thawing. Hexafluoropropene (HFP) was then introduced into the cooled (by liquid air) Carius tube using standard vacuum line techniques and the tube was sealed. After regaining room temperature, the carius tube was irradiated with UV radiation (approximately 1000 W from a medium pressure mercury lamp at a distance of about 100 mm), whilst being cooled by an electric fan to a temperature of about 60° C. Subsequently, the tube was cooled (by liquid air) and opened. Any remaining HFP was recovered as the tube returned to room temperature.

EXAMPLE 7

Fluorination of diethylpoly(ethylene oxide) derived from poly(ethylene oxide) of average molecular weight 400— (herein called "DEPEG 400")

A Carius tube was charged with DEPEG 400 (4.4 g, 9.8 mmol), acetone (11.9 g) and HFP (18.8 g, 125 mmol), and irradiated with UV radiation for 3 days all in the manner of Procedure A. HFP (4.9 g) was recovered and acetone removed under reduced pressure, to leave an almost colourless, viscous liquid, poly(2H-hexafluoropropyl)-α-ethyl-w-ethoxy poly(ethylene oxide) 400 which is represented by formula (8) as follows, with 8 equivalents of HFP incorporated (10.3 g, 63.8%). The IR number 3; and NMR data number 4, found for this product are consistent with the structure of formula (8) wherein n=6 and m=2.

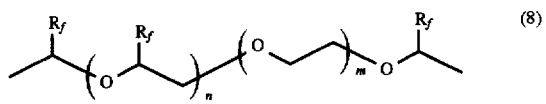

DEPEG 400 used in the above Examples was itself prepared in the following way, Procedure B.

Procedure B

Sodium hydride (8.3 g, 207 mmol, 60% dispersion in oil) was washed in petroleum ether (3×100 ml), residual petroleum ether being removed under vacuum. Dried (Dean-Stark) poly(ethylene oxide) 400 (PEG 400) (32.7 g, 82 mmol) in toluene (100 ml) was added dropwise and the reaction stirred mechanically, under dry nitrogen, for 5 hours. Diethyl sulphate (15.7 g, 102 mmol) was then added dropwise, and stirring continued a further 18 hours. Solvent and remaining diethyl sulphate were removed under reduced pressure. Dichloromethane (80 ml) was added to the reaction mixture, which was then passed down a column of aluminium oxide (approximately 300 g) in dichloromethane. The solution in dichloromethane obtained was dried with magnesium sulphate. Rigorous removal of the dichloromethane gave a viscous, clear liquid, DEPEG 400 (27.1 g, 73.7%); NMR number was 2: IR analysis showed that no hydroxy group were present.

EXAMPLE 8

Fluorination of diethylpoly(ethylene oxide) derived from poly(ethylene oxide) of average molecular weight 600 - herein called "DEPEG 600"

A Carius tube was charged with DEPEG 600 (4.0 g), acetone (7.9 g) and HFP (12.9 g), and irradiated with UV radiation for 3 days all in the manner of Procedure A. HFP (0.1 g) was recovered and acetone removed under reduced pressure, to leave an almost colourless viscous liquid, poly (2H-hexafluoropropyl)-α-ethyl-w-ethoxy-poly(ethylene oxide) 600 with 14 equivalents of HFP incorporated (2.3 g, 65.0%). IR and NMR data measured were consistent with the structure of formula (8) wherein n=12 and m=1.

The DEPEG 600 used in Example 8 was produced by Procedure C as follows.

Procedure C

Using the method of Procedure B above a dried solution of poly(ethylene oxide) 600 (PEG 600) (80.4 g, 134 mmol) in toluene (120 ml) was dripped onto washed sodium hydride (11.6 g of 60% dispersion in oil, 290 mmol) and stirred (5 hours). Diethyl sulphate (22.0 g, 143 mmol) was subsequently added and stirring continued (8 hours). After removal of the volatiles, passing down an alumina column in dichloromethane, drying and removal of a solvent a white waxy solid was obtained. DEPEG 600 (69.2 g, 79.4%); IR and NMR data were consistent with those for the lower molecular weight material obtained in Procedure B; IR analysis showed that no hydroxy groups were present.

EXAMPLE 9

Fluorination of diethyl poly(ethylene oxide) derived from poly(ethylene oxide) of average molecular weight 2000 - herein called DEPEG 2000)

A Carius tube was charged with DEPEG 2000 (5.3 g, 2.6 mmol), acetone (11.9 g) and HFP (18.3 g, 122 mmol), and was irradiated with UV radiation for 3 days all in the manner of Procedure A. HFP (4.5 g) was recovered and acetone removed under reduced pressure, to leave an almost colourless, viscous liquid, poly(2H-hexafluoropropyl)-α-ethyl-w-ethoxy poly(ethylene oxide) 2000 with 35 equivalents of HFP incorporated (12.8 g, 67.8%); IR and NMR data measured were consistent with the structure of formula (8) wherein n=33 and m=10.

DEPEG 2000 used in Example 9 was produced by Procedure D as follows.

Procedure D

Using the method of Procedure B above a dried solution of poly(ethylene oxide) 2000 (PEG 2000) (25.2 g, 12.6 mmol) in toluene (100 ml) was dripped on to washed sodium hydride (1.4 g of 60% dispersion in oil, 35 mmol) and stirred (5 hours). Diethyl sulphate (2.3 g, 15.mmol) was subsequently added and stirring continued (8 hours). Volatile components were removed under vacuum, and the residue passed down an alumina column in dichloromethane. After drying and removal of solvent a white solid was obtained, DEPEG 2000 (19.4 g, 75.3%). IR and NMR data were consistent with those for the analogous lower molecular weight materials obtained in Procedures B and C described above, IR analysis showed that no hydroxy groups were present.

EXAMPLE 10

Alternative fluorination of DEPEG 600

Fluorination of DEPEG 600 (prepared as in Procedure C) was carried out in the same manner as Example 8 except that in this case the weights of reagents used were as follows:

DEPEG 600: 4.5 g acetone : 7.9 g

HFP : 15.5 g

In this case 0.7 g HFP was recovered. Analysis of the product of formula (8) obtained showed that 14 molar equivalents of HFP had been incorporated.

EXAMPLE 11

Reaction of DEPEG 600 with octafluorocyclopentene

A Carius tube was charged with DEPEG 600 (1.1 g, 1.7 mmol), acetone (4 ml) and octafluorocyclopentene (7.2 g, 34 mmol) and was irradiated with UV radiation in the manner described in Procedure A above. After irradiation fluoroalkene (0.6 g) was recovered, and the acetone removed under reduced pressure. A dark brown, viscous liquid was obtained for which $^1$H and $^{19}$F n.m.r spectroscopy indicated a composition of DEPEG 600 containing an average of five (2H-octafluorocyclopentyl) groups attached (formula (8), where $R_f$=2H-octafluorocyclopentyl). Higher molecular weight material was also obtained.

EXAMPLE 12

Reaction of DEPEG 600 with hexafluorocyclobutene

A Carius tube was charged with DEPEG 600 (1.3 g, 2.0 mmol), acetone (4 ml) and hexafluorocyclobutene (11.6 g, 71.6 mmol). After UV irradiation as in Procedure A fluoroalkene (5.9 g) was recovered, and the acetone was removed under reduced pressure. A dark brown, viscous liquid was obtained for which $^1$H and $^{19}$F n.m.r. analysis indicated a compound of formula (8) having an average of five (2H-hexafluorocyclobutyl) groups attached. Higher molecular weight material was also obtained.

EXAMPLE 13

Reaction of PEG 600 with HFP

In the manner described in Example 7 a Carius tube was charged with poly(ethylene glycol) 600 (ie. material with an average molecular weight of 600) (3.2 g 5.3 mmol), acetone (15 ml), and HFP (19.4 g 129 mmol) and irradiated with UV radiation as in Example 7. After reaction HFP (15.9 g) was recovered, and acetone was removed under vacuum.

The $^1$H and $^{19}$F n.m.r. spectra showed approximately four molar equivalents of HFP to have been incorporated into the poly(ethylene glycol). The product was of the general formula (20) as follows:

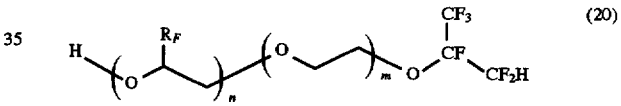

where $R_f$=CF$_2$CFHCF$_3$.

About half the hydroxy groups were found to have reacted with HFP in a nucleophilic manner (implying three molar equivalents of HFP to have reacted in a free radical manner and one equivalent nucleophilically). A viscous, brown material was obtained.

EXAMPLE 14

Reaction of diethylpoly(tetrahydrofuran) with HFP

In the manner described in Procedure A a Carius tube was charged with diethylpoly(tetrahydrofuran) (3.0 g, 2.9 mmol) (ie. poly(tetrahydrofuran) of average molecular weight 1000 which had subsequently been diethylated via the process described below), acetone (19.0 g) and HFP (16.1 g). After UV irradiation in the manner described in Procedure A excess HFP was recovered (5.7 g), and acetone removed under vacuum. NMR studies showed an average of 26 molar equivalents of HFP had been incorporated in the pale brown liquid obtained (12.8 g). The product was of general formula (21) as follows:

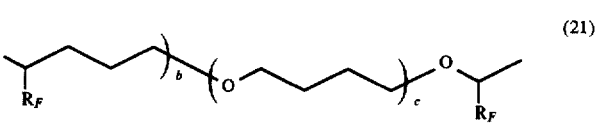

wherein $R_f$=CF$_2$CFCF$_3$, and 2a+b=24, a+b+c=13.

The diethylpoly(tetrahydrofuran) used in Example 14 was prepared by Procedure E as follows:

Procedure E

Using the same method as in Procedure B described above, a dried solution of poly(tetrahydrofuran) of average molecular weight 1000 (46.9 g, 47 mmol) in toluene (90 ml) was dripped onto washed sodium hydride (4.5 g of 60% dispersion in oil, 110 mmol) and stirred (5 hours). Diethyl sulphate (14.7 g, 95 mmol) was subsequently added and stirring continued (8 hours). After removal of the volatiles, this was passed down an alumina column in dichloromethane and the solvent was removed. A white solid was obtained, α-ethyl-w-ethoxy poly(tetramethylene oxide) 1000 (DEPTHF) (27.0 g, 54.8%); (Found: C, 66.8; H, 11.3; $C_{56}H_{114}O_{14}$ requires C, 66.5; H, 11.4%); IR number 2; NMR number 3.

EXAMPLE 15

Addition of 18-crown-6 polyether to HFP

A Carius tube, charged with 18-crown-6 polyether (4.2 g, 16 mmol), acetone (11.9 g) and HFP (17.9 g, 120 mmol), was irradiated with UV rays for 3 days as in Procedure A. HFP (0.4 g) was recovered and acetone removed under reduced pressure to leave a viscous, light brown liquid, poly(2H-hexafluoropropyl)-18-crown-6 formula (18), and NMR data indicated that 5 molar equivalents of HFP had been incorporated (11.6 g, 71.9%); (Found C, 32.3; H, 2.5: $C_{27}H_{24}F_{30}O_6$ requires C, 32.0; H, 2.4%); IR and NMR analysis were consistent with the structure specified.

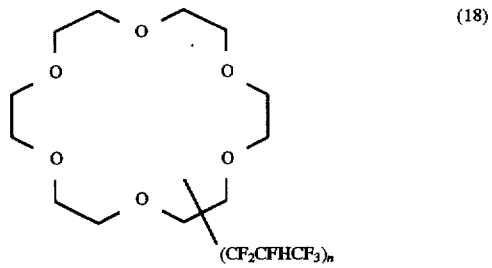
(18)

EXAMPLE 16

Addition of 18-Crown-6 polyether to pentafluoropropene

A Carius tube was charged with 18-crown-6 polyether (1.5 g, 6 mmol), pentafluoropropene (5.5 g, 42 mmol) and acetone (10 ml) and irradiated with UV radiation as in Procedure A and Example 7. After UV irradiation 0.1 g of pentafluoropropene was recovered. Acetone was removed under vacuum, and a viscous, pale brown liquid was obtained which $^1H$ and $^{19}F$ n.m.r. indicated was 18-crown-6 polyether to which an average of 5.0 (1', 1', 3',3', 3'-pentafluoropropyl) groups had been added to give a compound of formula (22) as follows where n=5.

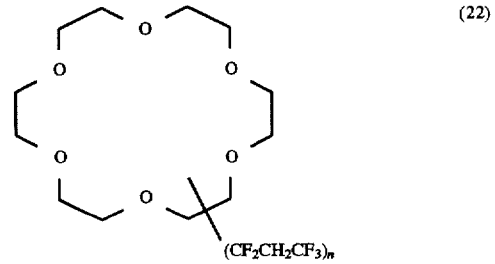
(22)

In the above mentioned comparative route using gamma-rays referred to in connection with Table 1 the following general procedure, Procedure F was used.

Procedure F

Solid and liquid reagents were introduced into a Pyrex Carius tube (capacity 60 ml) together with solvent if used, and degassed twice by freeze-thawing. HFP was then introduced into the cooled (liquid air) Carius tube using standard vacuum-line techniques, the tube then being sealed, and placed in a metal sleeve. After regaining room temperature, the Carius tube was irradiated with gamma-rays from a $^{60}Co$ source (85 krad hr$^{-1}$). Subsequently, the tube was cooled (liquid air) and opened. Any remaining HFP was recovered as the tube returned to room temperature. Products were poured out.

COMPARATIVE EXAMPLE A1

Addition of DEPEG 600 to HFP using gamma-initiation.

A Carius tube was charged with DEPEG 600 (3.7 g, 5.7 mmol), acetone (9.9 g) and HFP (39.7 g, 265 mmol), and then irradiated with gamma-rays for 4 days as in Procedure F. HFP (34.2 g) was recovered, and acetone removed under vacuum to leave a pale brown, viscous liquid (9.2 g), poly(2H-hexafluoropropyl)-α-ethyl-w-ethoxy-poly (ethylene oxide) 600, with 6 equivalents of HFP incorporated; (Found: C, 35.85; H 3.5; F, 46.2. $C_{51}H_{62}F_{42}O_{14}$ requires C, 36.0; H, 3.7; F, 47.0%); IR and NMR data were comparable to that of higher adducts.

COMPARATIVE EXAMPLE A2

Addition of DEPEG 600 to HFP using gamma-initiation.

A Carius tube was charged with DEPEG 2000 (4.7 g, 2.3 mmol), acetone (13.2 g) and HFP (30.3 g, 202 mmol), and then irradiated with gamma-rays for 7 days. HFP (23.1 g) was recovered, and acetone removed under vacuum, to leave a pale brown, viscous liquid (8.6 g), poly(2H-hexafluoropropyl)-α-ethyl-w-ethoxy poly(ethylene oxide) 2000, with 14 equivalents of HFP incorporated; IR and NMR data were consistent with that of lower molecular weight samples; IR number 4.

We claim:

1. In a process for the preparation of a perfluoropolyether having the formula:

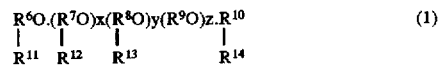
(1)

wherein $R^6$ to $R^{14}$ each represents a fully fluorinated hydrocarbon group, x is an integer and each of y and z is zero or an integer, and the sum of x, y and z is at least 2 and not greater than 100, which process includes direct fluorination with elemental fluorine of a polyether having the formula:

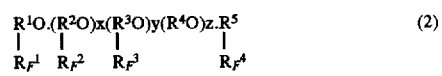
(2)

wherein $R^1$, $R^2$, $R^3$, $R^4$ and $R^5$ each represent substituted or unsubstituted hydrocarbon groups, which groups may differ, $R_F^1$, $R_F^2$, $R_F^3$, and $R_F^4$ each represent fluorine-containing hydrocarbon groups containing at least two carbon atoms and at least two fluorine atoms, which groups may differ, or the combination $R^1$—$R_F^1$ or the combination $R^5$—$R_F^4$ or both represent a fluorine-containing alkyl or alkenyl group, x is an integer and each of y and z is zero or an integer, and the sum of x, y and z is at least 2 and not greater than 100, the improvement wherein the fluorination is carried out in the presence of a solvent which is a fluorinated ether having at least one substituent $R_F$ group, wherein $R_F$ is a fluorinated hydrocarbon group, and wherein under the reaction conditions fluorination of the solvent takes place at the same time as the fluorination of the polyether (2).

2. A process as claimed in claim 1 wherein the solvent ether is a fluorinated volatile ether.

3. A process as claimed in claim 1 wherein the solvent ether has at least two groups $R_F$ which may be the same or different groups.

4. A process as claimed in claim 3 wherein each group $R_F$ has from two to four carbon atoms and at least two fluorine atoms.

5. A process as claimed in claim 1 and wherein the solvent ether is an alicyclic ether having from 3 to 5 carbon atoms in its alicyclic ring.

6. A process as claimed in claim 5 wherein the solvent ether is of the formula:

 (3)

7. A process as claimed in any one of claim 3 wherein each $R_F$ group is $CF_2CFHCF_3$.

8. A process as claimed in claim 1 wherein the intermediates having units of formula (1) are prepared by reacting a linear or branched chained or cyclic polyether of or having units of formula (4) or (5)

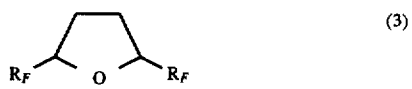 (4)

or

 (5)

with a straight chained or cyclic fluoroalkane containing at least two fluorine atoms in the presence of a sensitizing medium which when energized helps to induce the reaction and ultra-violet radiation is applied to the medium to energize the medium.

9. A process as in claim 8 wherein the sensitising medium is an organic liquid which is a solvent for the reagents having a strong extinction coefficient in the spectral region of the applied ultra-violet radiation.

10. A process as in claim 9, wherein the sensitising medium comprises acetone or trifluorethanol.

11. A process as in claim 1 wherein the polyether of formula (1) is selected from diethyl (polyethylene oxides); dihydroxy (polyethylene oxides); diethyl (polytetrahydrofurans) and cyclic polyethers.

12. A process as in claim 9 wherein the fluoroalkene is selected from one of the following having five or more fluorine atoms, fluoropropenes, fluorobutenes, fluoropentenes and fluorohexenes, fluorocyclobutenes, fluorocyclopentenes and fluorocyclohexenes.

* * * * *